(12) United States Patent
Scanlon

(10) Patent No.: US 6,421,301 B1
(45) Date of Patent: Jul. 16, 2002

(54) TRANSDUCER SHIELD

(76) Inventor: William J. Scanlon, 5109 Highway 48 West, McComb, MS (US) 39648

( * ) Notice: Subject to any disclaimer, the term of this patent is extended or adjusted under 35 U.S.C. 154(b) by 0 days.

(21) Appl. No.: 09/753,564

(22) Filed: Jan. 4, 2001

(51) Int. Cl.[7] .................................................. H04R 1/02
(52) U.S. Cl. ....................................................... 367/173
(58) Field of Search ................................. 367/173, 188; 248/229.17, 230.8

(56) References Cited

U.S. PATENT DOCUMENTS

| 2,528,173 A | 10/1950 | Pinckney |
| 3,740,706 A | 6/1973 | Joseph |
| 3,880,106 A | 4/1975 | Farmer |
| 3,907,239 A | 9/1975 | Ehrlich |
| 4,152,690 A | 5/1979 | Veatch |
| 4,926,399 A | 5/1990 | Hickman |
| 5,015,225 A | 5/1991 | Blomberg |

FOREIGN PATENT DOCUMENTS

| GB | 529900 | 11/1940 |
| NO | 83572 | 3/1954 |

OTHER PUBLICATIONS

The StumpBumper.com webpage, Feb. 2002, four pages.*

* cited by examiner

*Primary Examiner*—Daniel T. Pihulic
(74) *Attorney, Agent, or Firm*—Stephen R. Greiner

(57) ABSTRACT

A shield for a sonar transducer secured by a flexible clamping band to the bottom of a trolling motor housing. The shield includes a box-like body sized to receive a transducer. The body further includes an open top for flush positioning against a trolling motor housing and an open bottom through which sonar transmissions from the transducer may pass. The body has a pair of slots adjacent its open top for the passage of a clamping band of a hose clamp.

12 Claims, 2 Drawing Sheets

TRANSDUCER SHIELD

FIELD OF THE INVENTION

The present invention relates generally to acoustic wave devices and, in particular, to underwater signal transducers with supports.

BACKGROUND OF THE INVENTION

Electronic devices for determining the depth of a body of water and locating fish have long been used. These devices often employ a sonar transducer configured for mounting upon the trolling motor of a boat so that a user may gather sonar information from the point on the boat closest to that being fished. Unfortunately, since this point is the first to contact rocks, stumps and the like, and since sonar transducers are notoriously fragile in their construction, sonar transducers are prone to breakage. Replacing several transducers over the course of a busy season can make fishing an unnecessarily costly pastime.

SUMMARY OF THE INVENTION

In light of the problems associated with the known sonar transducers used to determine water depth and to find fish, it is a principal object of the present invention to provide a protective cover or shield capable of reducing the likelihood of damage to motor-mounted sonar transducers. The shield surrounds the transducer on at least three sides, leaving the bottom open for the transmission and reception of sonar signals. Thus, after installation of the shield, the transducer is free to operate in its usual manner with no effect upon its acquisition of sonar data.

It is another object of the invention to provide a transducer shield of the type described that may utilize the mounting band of a sonar transducer to hold such in place. This being the case, no special tools are required for installation of the transducer shield. Furthermore, no modification of the trolling motor or sonar transducer is required for use of the shield.

It is another object of the invention to provide a shield that can be configured to protect a wide variety of makes and models of sonar transducers. It is believed that the inventive shield has almost universal application in that transom-mounted transducers may also be carried within the shield.

It is an object of the invention to provide improved elements and arrangements thereof in a transducer shield for the purposes described which is lightweight in construction, inexpensive to manufacture, and dependable in use.

Briefly, the transducer shield in accordance with this invention achieves the intended objects by featuring a box-like body for snugly receiving a sonar transducer. The body has a curved, open top for flush positioning against a trolling motor housing and an open bottom through which sonar transmissions from the transducer may pass. The body has a pair of slots adjacent the open top for the passage of a clamping band of a trolling motor housing-encircling hose clamp. The front end portion of the body may be V-shaped like the prow of a boat or gradually curved to shed aquatic weeds and reduce drag.

The foregoing and other objects, features and advantages of the present invention will become readily apparent upon further review of the following detailed description of the preferred embodiments as illustrated in the accompanying drawings.

BRIEF DESCRIPTION OF THE DRAWINGS

The present invention may be more readily described with reference to the accompanying drawings, in which:.

Similar reference characters denote corresponding features consistently throughout the accompanying drawings.

DETAILED DESCRIPTION OF THE PREFERRED EMBODIMENTS

Figure 1:
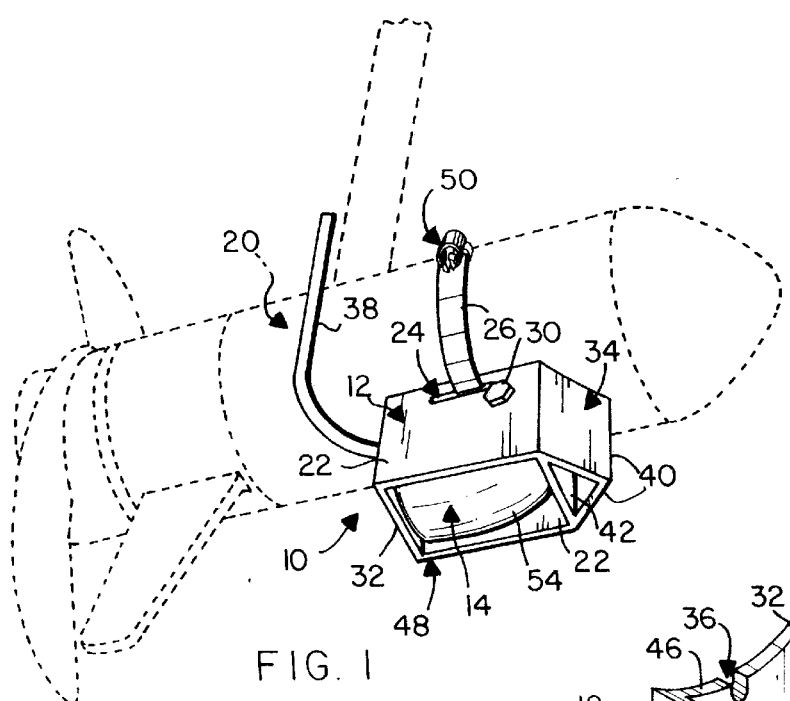
FIG. 1 is a perspective view of a transducer shield in accordance with the present invention shown mounted upon a trolling motor housing and surrounding a transducer.
Figure 2:
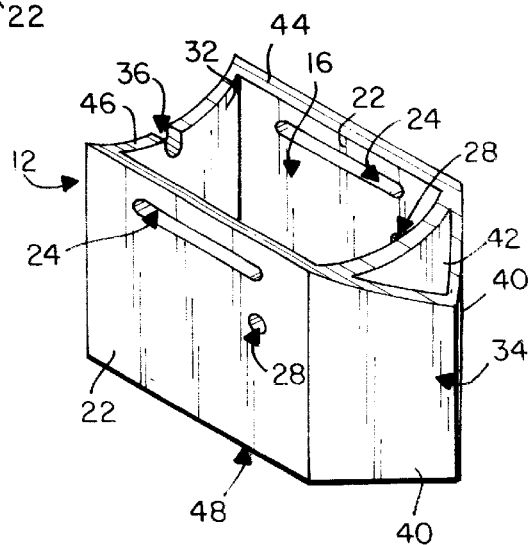
FIG. 2 is a perspective view of the transducer shield of FIG. 1.
Figure 3:
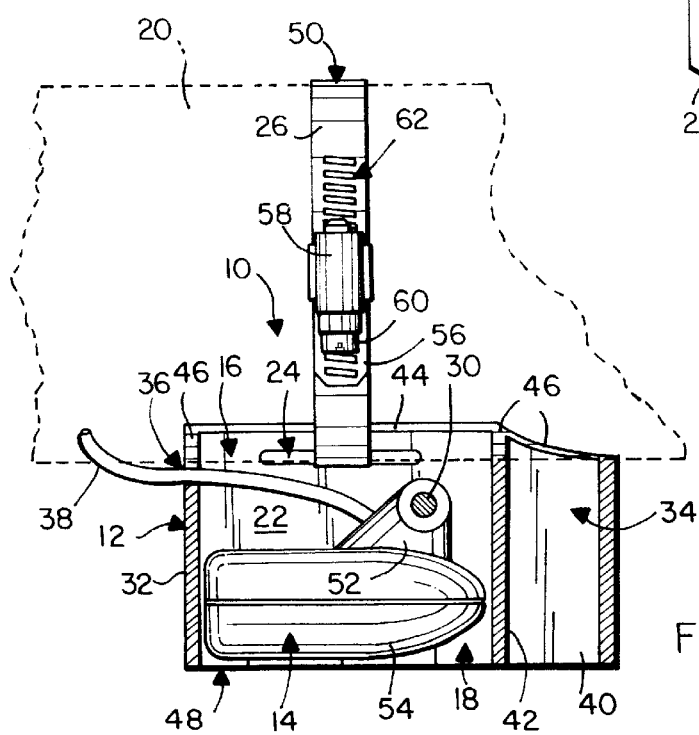
FIG. 3 is a side view of the transducer shield with portions removed to reveal internal details thereof, the transducer shield being mounted upon a trolling motor housing and surrounding a transducer.

Referring now to FIGS. 1–3, a transducer shield in accordance with the present invention is shown at 10. Shield 10 includes a box-like body 12 sized to receive a sonar transducer 14. Body 12 has an open top 16 and an open bottom 18 for access to transducer 14. Top 16 is scalloped for a flush fit against the bottom of a trolling motor housing 20. The opposed side portions 22 of body 12 are provided with aligned slots 24 through which a flexible, clamping band 26 may be extended. Aligned apertures 28 adjacent slots 24 are provided for the passage of a transducer-retaining bolt 30.

Body 12 includes a pair of rectangular side portions 22 joined together by spaced-apart, rear end and front end portions 32 and 34. Rear end portion 32. is generally rectangular in outline and has a notch 36 cut in its top for the passage of a transducer cable 38. The front end portion 34 includes a pair of generally rectangular panels 40 connected at their forward ends so as to form a "V" like the prow of a boat for passing through water in a streamlined fashion. The rearward ends of panels 40 (and front ends of side portions 22) are joined together by a connector portion 42 oriented parallel to rear end portion 32.

Scalloped, open top 16 of body 12 is defined by sloping or curved surfaces in side portions 22, rear portion 32, front portion 34, and connector portion 42. As shown, the top edges 44 of side portions 22 slope downwardly and inwardly toward one another. Rear portion 32, front portion 34 and connector portion 42, however, are provided with concave top edges as at 46 between their respective ends that curve smoothly into top edges 44. Concave top edges 46 have radii identical to that of trolling motor housing 20 for a flush fit therebetween.

Open bottom 18 of body 12 is defined by a flat, smooth edge 48 oriented generally parallel to top edges 44 and 46. Such an orientation limits the likelihood that body 12 will snag upon submerged objects.

Slots 24 have dimensions sufficient to accommodate the passage of clamping band 26 of hose clamp 50. The width of each slot 24 is several times that of band 26 so that band 26 can be easily passed through slot 24. The length of each slot 24 is also several times that of band 26 permitting the position of body 12 on motor housing 20 to be adjusted.

Apertures 28 are positioned adjacent to the front ends of slots 24 and have diameters sufficient for the snug passage of bolt 30. Bolt 30 penetrates the transversely apertured, retaining fin 52 of transducer 14. The electronics-containing bulb 54 of transducer 14 is suspended from fin 52 and, during use, located between portions 22, 32 and 34.

Use of shield 10 is straightforward. First, transducer 14 is located within body 12 with cable 38 extending through notch 36 and connected to a sonar processor and display apparatus (not shown). Second, bolt 30 is extended through fin 52 to lock transducer 14 in place. Next, open top 16 of shield 10 is pressed against the bottom of motor housing 20 at the spot where such is to be mounted. Then, the free end 56 of band 26 is fed through slots 24, wrapped around motor housing 20 and drawn into gear box 58 at the other end of band 26. Finally, by the continued turning of a screw 60 rotatably carried by gear box. 58 (and acting as a worm gear by engaging closely spaced slots 62 in band 26), band 26 is pulled tightly around motor housing 20 to clamp body 12 in place. Upon submerging transducer 14 in water, it may be used in the usual manner except that it is now armored against impacts with underwater objects.

Figure 4:
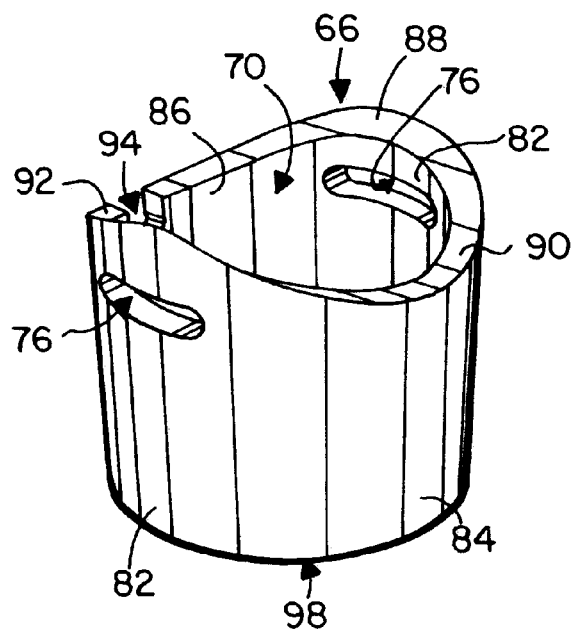
FIG. 4 is a perspective view of a second embodiment of the transducer shield in accordance with the present invention.
Figure 5:
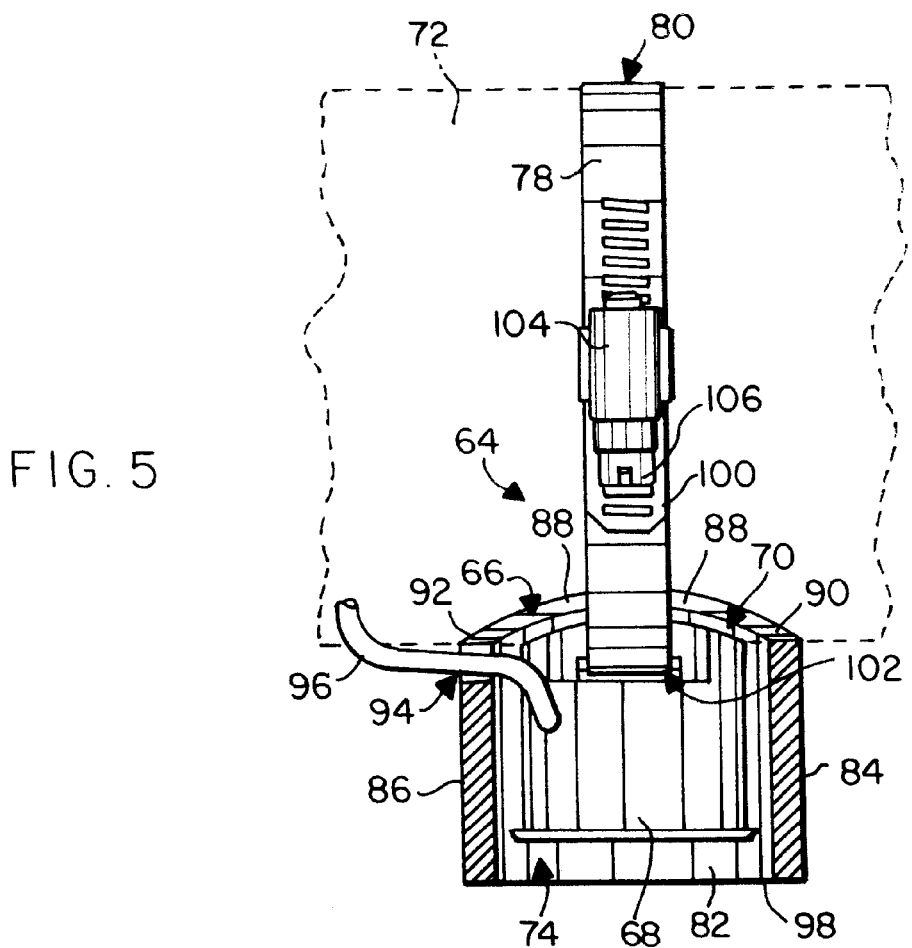
FIG. 5 is a side view of the transducer shield of FIG. 4 with portions removed to reveal internal details thereof, the transducer shield being mounted upon a trolling motor housing and surrounding a transducer.

Referring now to FIGS. 4 and 5, a second embodiment of the shield is shown at 64. Shield 64 includes a box-like body 66 sized to receive a sonar transducer 68. Body 66 has a scalloped, open top 70 for a flush fit against the bottom of a trolling motor housing 72 and an open bottom 74 from which sonar signals from transducer 68 may be broadcast. Body 66 is provided with opposed slots 76 through which a flexible, clamping band 78 of hose clamp 80 may be extended to simultaneously secure body 66 and transducer 68 to the bottom of motor, housing 72.

Body 66 is circular in outline and cylindrical in shape and includes integrally formed side, front end and rear end portions 82, 84 and 86. Here, side portions 82 are the parts of body 66 above and below slots 76. Front end portion 84 is the part of body 66 forward of slots 76 and rear end portion 86 is the part of body 66 rearwardly of slots 76. Since portions 82, 84 and 86 smoothly flow from one into the other, a streamlined shape is presented to the water regardless of the exact direction of travel of motor housing 72.

Scalloped open top 70 of body 66 is defined by the continuously curving top surfaces of side, front end and rear end portions 82, 84 and 86. The top edges 88 of side portions 82 are generally convex in outline and are tapered in thickness so as to slope downwardly and inwardly toward one another. On the other hand, front end and rear end portions 84 and 86 have top edges 90 and 92 of generally even width that are concave. As shown, top edges 90 and 92 curve smoothly into top edges 88. Top edge 92 has a notch 94 for the passage of transducer cable 96.

Open bottom 74 of body 66 is defined by a bottom edge 98 that is circular and flat. Edge 98 is oriented generally parallel to top edges 88, 90 and 92.

Slots 76 are located one hundred eighty degrees apart in body 66. Preferably, slots 76 have equal dimensions and are several times taller and wider than clamping band 78. Slots 76 are positioned at equal distances from bottom edge 98.

Shield 64 is used in much the same way as shield 10. Here, transducer 68 is first positioned within body 66 and cable 96 is positioned in notch 94. Then, top 70 of shield 64 is pressed against the bottom of housing 72. Next, the free end 100 of band 78 is extended through slots 76 and 102 in body 66 and in the top of transducer 68. Band 78 may now be extended around housing 72 and drawn into gear box 104 on band 78. Finally, by turning clamping screw 106 carried by gear box 104, band 78 is pulled tightly around housing 72 clamping body 66 and transducer 68 in place. Transducer 68 may now be used in the usual manner.

With the use of either shield 10 or 64, made from aluminum or any other suitable material, a sonar transducer is protected against impacts with underwater objects that cannot be seen by a sport fisherman. Transducers whose mounting features were damaged prior to shield 10 or 64 being used, can be cemented into a shield by epoxy resin or silicone sealant material. Thus, it is never too late to employ a shield embodying the present invention.

While the invention has been described with a high degree of particularity, it will be appreciated by those skilled in the art that modifications may be made thereto. For example, the rear end portions 32 and 86 of shields 10 and 64 may be removed to reduce production costs and save weight number. It should be noted that in backing up a boat such a shield would expose a transducer to a slight risk of damage but this risk is reduced by the sweeping action of a nearby propeller. Additionally, if desired, front end portion 34 may be omitted from body 12 with connector portion 42 effectively serving as a front end portion. Therefore, it is to be understood that the present invention is not limited to the sole embodiment described above, but encompasses any and all embodiments within the scope of the following claims.

I claim:

1. A transducer shield comprising a body for receiving a sonar transducer, said body having an open top for flush positioning against a trolling motor housing and an open bottom through which sonar transmissions from the transducer may pass, said body having a pair of slots adjacent said open top for the passage of a clamping band.

2. The transducer shield according to claim 1 wherein said body includes:
   a pair of opposed side portions each having a front end and a rear end and one of said slots between said front end and said rear end; and,
   a front end portion joining said front ends of said side portions together.

3. The transducer shield according to claim 2 wherein said body includes a rear end portion joining said rear ends of said side portions together, said rear end portion having a notch in its top for the passage of a cable extending from the sonar transducer.

4. The transducer shield according to claim 2 wherein said front end portion includes a pair of rectangular panels having forward and rearward ends, said forward ends being connected together at an angle so as to form a "V" and said rearward ends being joined to said front ends of said side portions.

5. The transducer shield according to claim 4 further comprising a planar connector portion joining said front ends of said side portions and said rearward ends of said rectangular panels together.

6. The transducer shield according to claim 1 wherein said open top of said body is curved for a flush fit against the bottom of a trolling motor housing.

7. The transducer shield according to claim 1 further having a pair of apertures adjacent said slots for the passage of a sonar transducer-retaining bolt.

8. The transducer shield according to claim 1 further comprising a hose clamp having a clamping band extending through said slots.

9. The transducer shield according to claim 1 further comprising a sonar transducer mounted within said body.

10. The transducer shield according to claim 1 wherein said body is circular in outline.

11. A transducer shield for positioning against the bottom of a trolling motor housing, said transducer shield comprising:

a body for receiving a sonar transducer, said body including:

a pair of opposed side portions each having a front end and a rear end and a slot and an adjacent aperture between said front end and said rear end;

a front end portion joining said front ends of said side portions together, said front end portion including a pair of rectangular panels having forward and rearward ends, said forward ends being connected together at an angle so as to form a "V" and said rearward ends being joined to said front ends of said side portions;

a planar connector portion joining said front ends of said side portions and said rearward ends of said rectangular panels together;

a rear end portion joining said rear ends of said side portions together; and, an open bottom through which sonar transmissions from the transducer may pass.

12. A transducer shield comprising a cylindrical body for receiving a sonar transducer, said body having an curved, open top for flush positioning against a trolling motor housing and an open bottom through which sonar transmissions from the transducer may pass, said body having. a pair of slots adjacent said open top for the passage of a clamping band.

* * * * *